United States Patent
Parks et al.

(10) Patent No.: US 7,794,358 B2
(45) Date of Patent: Sep. 14, 2010

(54) TORQUE CONVERTER WITH FIXED STATOR AND METHOD OF CONTROLLING ROTATION OF A TURBINE AND PUMP IN A TORQUE CONVERTER

(75) Inventors: Kevin Parks, Wooster, OH (US); George Bailey, Wooster, OH (US)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 627 days.

(21) Appl. No.: 11/811,712

(22) Filed: Jun. 12, 2007

(65) Prior Publication Data

US 2007/0287581 A1    Dec. 13, 2007

Related U.S. Application Data

(60) Provisional application No. 60/812,829, filed on Jun. 12, 2006.

(51) Int. Cl.
  *B60W 10/02*    (2006.01)
  *B60W 10/04*    (2006.01)
(52) U.S. Cl. .................. 477/169; 477/180; 477/181; 192/3.25; 192/3.31
(58) Field of Classification Search ............... 192/3.25, 192/3.31
  See application file for complete search history.

(56) References Cited

U.S. PATENT DOCUMENTS

| | | | |
|---|---|---|---|
| 5,040,648 A | * | 8/1991 | Mitchell et al. ............ 192/3.58 |
| 5,456,333 A | * | 10/1995 | Brandt et al. ............... 180/336 |
| 5,509,520 A | | 4/1996 | Evans et al. |
| 5,613,581 A | | 3/1997 | Fonkalsrud et al. |
| 5,947,242 A | | 9/1999 | Creger |
| 6,019,202 A | | 2/2000 | Anwar |
| 6,494,303 B1 | | 12/2002 | Reik et al. |
| 2007/0074943 A1 | | 4/2007 | Hemphill et al. |

\* cited by examiner

*Primary Examiner*—Sherry L Estremsky
*Assistant Examiner*—Erin D Bishop
(74) *Attorney, Agent, or Firm*—Simpson & Simpson, PLLC

(57) ABSTRACT

A method of transitioning a torque converter from torque conversion mode to lock-up mode, and a torque converter. The method includes rotationally fixing stator blades to a non-rotatable stator shaft; partially engaging a torque converter clutch to transmit torque from a housing to a turbine at a first speed ratio between the turbine and the housing; disengaging a pump clutch at a second speed ratio between the turbine and the housing, the pump clutch arranged to transmit torque from the housing to the pump; and fully engaging the torque converter clutch at a third speed ratio between the housing and the turbine. The second ratio can be less than a ratio for a coupling point. The torque converter has torque converter and pump clutches, a non-rotatable stator, and a connection point between a turbine and hub, at least partially radially aligned with an inner ring for the stator.

11 Claims, 11 Drawing Sheets

PRIOR ART

PRIOR ART

PRIOR ART

TORQUE CONVERTER WITH FIXED STATOR AND METHOD OF CONTROLLING ROTATION OF A TURBINE AND PUMP IN A TORQUE CONVERTER

CROSS-REFERENCE TO RELATED APPLICATIONS

This application claims the benefit under 35 U.S.C. §119 (e) of U.S. Provisional Application No. 60/812,829 filed Jun. 12, 2006.

FIELD OF THE INVENTION

The invention relates to improvements in apparatus for transmitting force between a rotary driving unit (such as the engine of a motor vehicle) and a rotary driven unit (such as the variable-speed transmission in the motor vehicle). In particular, the invention relates to a method of operating a torque converter with a fixed stator in torque conversion and lock-up mode. The invention also relates to a torque converter with a fixed stator and reduced axial width requirements for the stator.

BACKGROUND OF THE INVENTION

FIG. 1 illustrates a general block diagram showing the relationship of the engine 7, torque converter 10, transmission 8, and differential/axle assembly 9 in a typical vehicle. It is well known that a torque converter is used to transmit torque from an engine to a transmission of a motor vehicle.

The three main components of the torque converter are the pump 37, turbine 38, and stator 39. The torque converter becomes a sealed chamber when the pump is welded to cover 11. The cover is connected to flexplate 41 which is, in turn, bolted to crankshaft 42 of engine 7. The cover can be connected to the flexplate using lugs or studs welded to the cover. The welded connection between the pump and cover transmits engine torque to the pump. Therefore, the pump always rotates at engine speed. The function of the pump is to use this rotational motion to propel the fluid radially outward and axially towards the turbine. Therefore, the pump is a centrifugal pump propelling fluid from a small radial inlet to a large radial outlet, increasing the energy in the fluid. Pressure to engage transmission clutches and the torque converter clutch is supplied by an additional pump in the transmission that is driven by the pump hub.

In torque converter 10 a fluid circuit is created by the pump (sometimes called an impeller), the turbine, and the stator (sometimes called a reactor). The fluid circuit allows the engine to continue rotating when the vehicle is stopped, and accelerate the vehicle when desired by a driver. The torque converter supplements engine torque through torque ratio, similar to a gear reduction. Torque ratio is the ratio of output torque to input torque. Torque ratio is highest at low or no turbine rotational speed (also called stall). Stall torque ratios are typically within a range of 1.8-2.2. This means that the output torque of the torque converter is 1.8-2.2 times greater than the input torque. Output speed, however, is much lower than input speed, because the turbine is connected to the output and it is not rotating, but the input is rotating at engine speed.

Turbine 38 uses the fluid energy it receives from pump 37 to propel the vehicle. Turbine shell 22 is connected to turbine hub 19. Turbine hub 19 uses a spline connection to transmit turbine torque to transmission input shaft 43. The input shaft is connected to the wheels of the vehicle through gears and shafts in transmission 8 and axle differential 9. The force of the fluid impacting the turbine blades is output from the turbine as torque. Axial thrust bearings 31 support the components from axial forces imparted by the fluid. When output torque is sufficient to overcome the inertia of the vehicle at rest, the vehicle begins to move.

After the fluid energy is converted to torque by the turbine, there is still some energy left in the fluid. The fluid exiting from small radial outlet 44 would ordinarily enter the pump in such a manner as to oppose the rotation of the pump. Stator 39 is used to redirect the fluid to help accelerate the pump, thereby increasing torque ratio. Stator 39 is connected to stator shaft 45 through one-way clutch 46. The stator shaft is connected to transmission housing 47 and does not rotate. One-way clutch 46 prevents stator 39 from rotating at low speed ratios (where the pump is spinning faster than the turbine). Fluid entering stator 39 from turbine outlet 44 is turned by stator blades 48 to enter pump 37 in the direction of rotation.

The blade inlet and exit angles, the pump and turbine shell shapes, and the overall diameter of the torque converter influence its performance. Design parameters include the torque ratio, efficiency, and ability of the torque converter to absorb engine torque without allowing the engine to "run away." This occurs if the torque converter is too small and the pump can't slow the engine.

At low speed ratios, the torque converter works well to allow the engine to rotate while the vehicle is stationary, and to supplement engine torque for increased performance. At speed ratios less than 1, the torque converter is less than 100% efficient. The torque ratio of the torque converter gradually reduces from a high of about 1.8 to 2.2, to a torque ratio of about 1 as the turbine rotational speed approaches the pump rotational speed. The speed ratio when the torque ratio reaches 1 is called the coupling point. At this point, the fluid entering the stator no longer needs redirected, and the one way clutch in the stator allows it to rotate in the same direction as the pump and turbine. Because the stator is not redirecting the fluid, torque output from the torque converter is the same as torque input. The entire fluid circuit will rotate as a unit.

Peak torque converter efficiency is limited to 92-93% based on losses in the fluid. Therefore torque converter clutch 49 is employed to mechanically connect the torque converter input to the output, improving efficiency to 100%. Clutch piston plate 17 is hydraulically applied when commanded by the transmission controller. Piston plate 17 is sealed to turbine hub 19 at its inner diameter by o-ring 18 and to cover 11 at its outer diameter by friction material ring 51. These seals create a pressure chamber and force piston plate 17 into engagement with cover 11. This mechanical connection bypasses the torque converter fluid circuit.

The mechanical connection of torque converter clutch 49 transmits many more engine torsional fluctuations to the drivetrain. As the drivetrain is basically a spring-mass system, torsional fluctuations from the engine can excite natural frequencies of the system. A damper is employed to shift the drivetrain natural frequencies out of the driving range. The damper includes springs 15 in series with engine 7 and transmission 8 to lower the effective spring rate of the system, thereby lowering the natural frequency.

Torque converter clutch 49 generally comprises four components: piston plate 17, cover plates 12 and 16, springs 15, and flange 13. Cover plates 12 and 16 transmit torque from piston plate 17 to compression springs 15. Cover plate wings 52 are formed around springs 15 for axial retention. Torque from piston plate 17 is transmitted to cover plates 12 and 16 through a riveted connection. Cover plates 12 and 16 impart torque to compression springs 15 by contact with an edge of a spring window. Both cover plates work in combination to support the spring on both sides of the spring center axis. Spring force is transmitted to flange 13 by contact with a flange spring window edge. Sometimes the flange also has a rotational tab or slot which engages a portion of the cover plate to prevent over-compression of the springs during high torque events. Torque from flange 13 is transmitted to turbine hub 19 and into transmission input shaft 43.

Energy absorption can be accomplished through friction, sometimes called hysteresis, if desired. Hysteresis includes friction from windup and unwinding of the damper plates, so it is twice the actual friction torque. The hysteresis package generally consists of diaphragm (or Belleville) spring 14 which is placed between flange 13 and one of cover plates 16 to urge flange 13 into contact with the other cover plate 12. By controlling the amount of force exerted by diaphragm spring 14, the amount of friction torque can also be controlled. Typical hysteresis values are in the range of 10-30 Nm.

Unfortunately, one-way clutch 46 increases the cost, weight, and complexity of stator 39, and subsequently, of torque converter 10. Also, one-way clutch 46 undesirably increases the axial space required for stator 39. It is known to use a torque converter without a stator one-way clutch. For example, U.S. Pat. Nos. 5,509,520; 5,613,581; 5,947,242; and 6,019,202 disclose a torque converter with a torque converter clutch, a pump clutch, and a fixed stator. These patents are directed toward heavy equipment and the use of a brake on the pump clutch to "inch" the heavy equipment. Unfortunately, the patents do not address operation of a torque converter in the transition from a torque conversion mode to a lock-up mode.

Thus, there is a long-felt need for a torque converter having a fixed stator without a one-way clutch and capable of efficiently transitioning from a torque conversion mode to a lock-up mode. There also is a long-felt need to reduce the axial dimensions of a stator in a torque converter.

BRIEF SUMMARY OF THE INVENTION

The present invention broadly comprises a method of transitioning a torque converter from a torque conversion mode to a lock-up mode. The method includes the steps of: rotationally fixing a plurality of stator blades in the torque converter to a non-rotatable stator shaft of the torque converter; partially engaging a torque converter clutch in the torque converter to transmit torque from a housing for the torque converter to a turbine in the torque converter at a first speed ratio between the turbine and the housing, disengaging a pump clutch at a second speed ratio between the turbine and the housing, the pump clutch arranged to transmit torque from the housing to the pump; and fully engaging the torque converter clutch at a third speed ratio between the housing and the turbine.

In some aspects, the first speed ratio is less than the second speed ratio or the second speed ratio is less than a fourth speed ratio between the housing and the turbine. The fourth speed ratio is associated with a first coupling point between the turbine and the pump. In some aspects, the fourth speed ratio is approximately 0.8. In some aspects, the third speed ratio is greater than a fifth speed ratio between the housing and the turbine and the fifth speed ratio is associated with a second coupling point between the turbine and the pump. In some aspects, the fifth speed ratio is approximately 0.8, the first speed ratio is approximately 0.5, the second speed ratio is approximately 0.7, the second speed ratio is approximately one, or the third speed ratio is approximately one. In some aspects, the torque converter is connected to a drive unit and the method includes fully engaging the pump clutch and accelerating the drive unit to reach the first speed ratio.

The present invention also broadly comprises a torque converter with a torque converter clutch arranged to transmit torque from a housing of the torque converter to a turbine of the torque converter; a pump clutch arranged to transmit torque from the housing to an impeller for the torque converter; a non-rotatable stator with an inner ring; and at least one connection point between the turbine and an output hub for the torque converter. The connection point is at least partially radially aligned with the inner ring. In some aspects, the torque converter includes a thrust washer rotationally connected to the inner ring, rotationally connected to a non-rotatable stator shaft, and rotationally connecting the stator and the stator shaft. In some aspects, the thrust washer is formed by stamping.

It is a general object of the present invention to provide a method of using a torque converter with a fixed stator in torque conversion and lock-up modes.

It is another object of the present invention to provide a means of reducing the weight, cost, and axial width of a stator in a torque converter.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
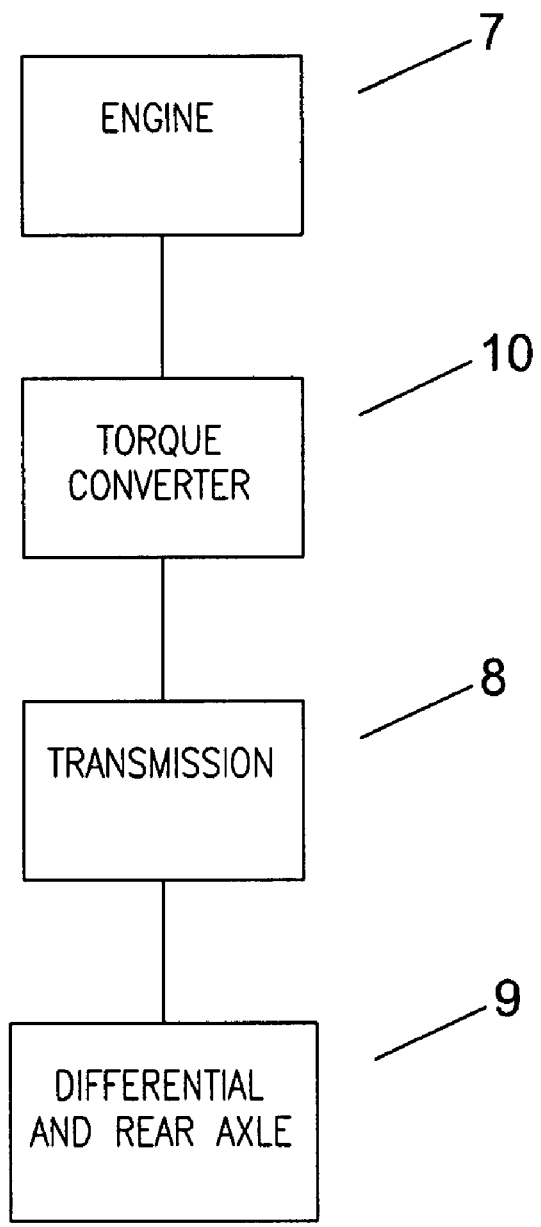
FIG. 1 is a general block diagram illustration of power flow in a motor vehicle, intended to help explain the relationship and function of a torque converter in the drive train thereof.
Figure 2:
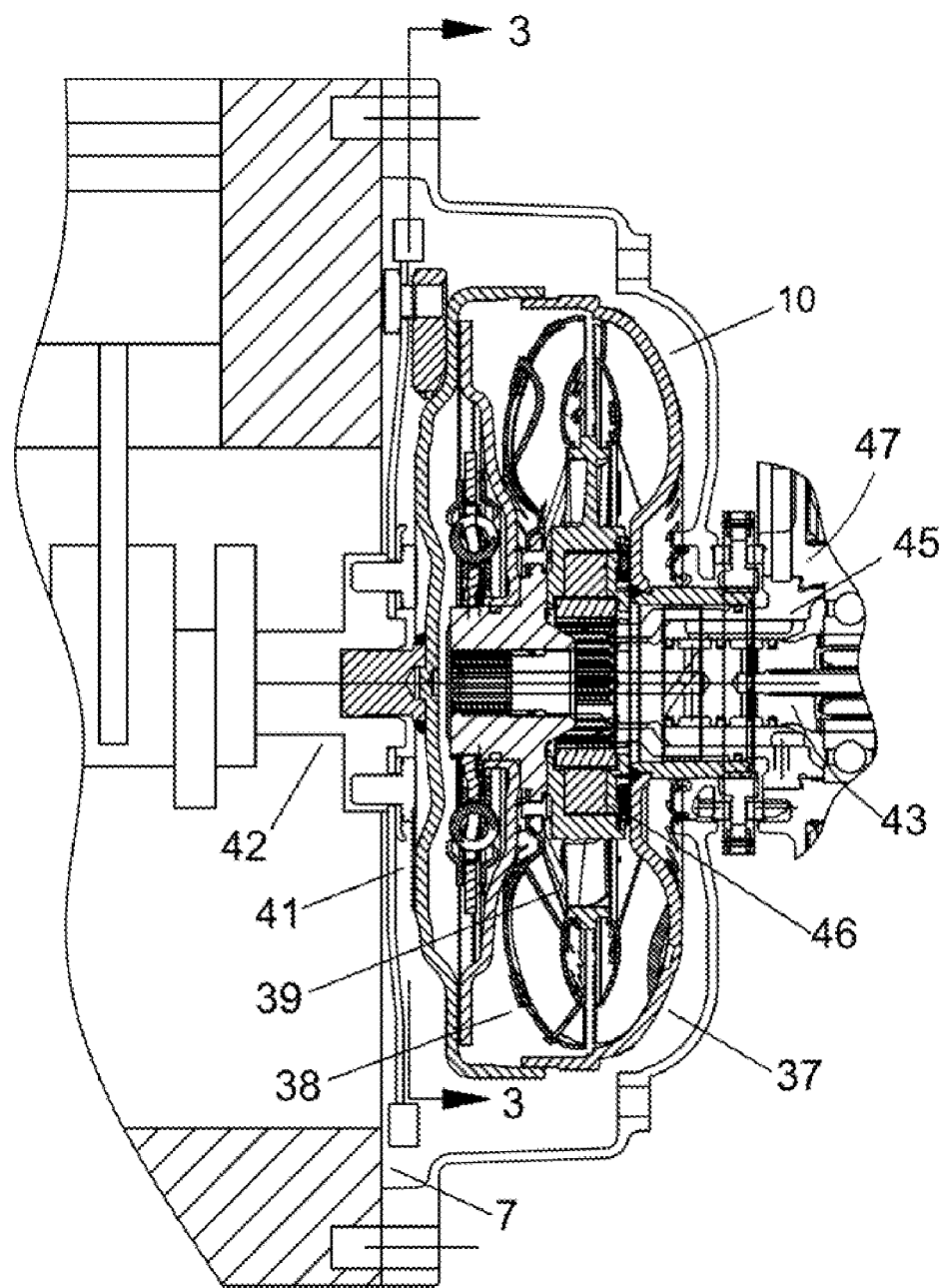
FIG. 2 is a cross-sectional view of a prior art torque converter, shown secured to an engine of a motor vehicle.
Figure 3:
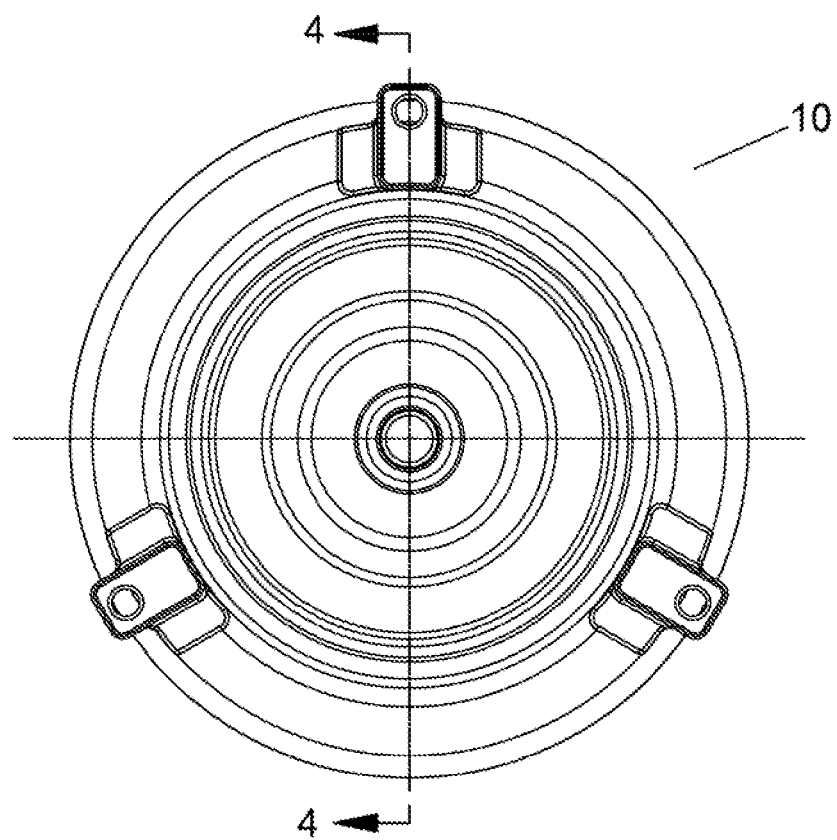
FIG. 3 is a left view of the torque converter shown in FIG. 2, taken generally along line 3-3 in FIG. 2.
Figure 4:
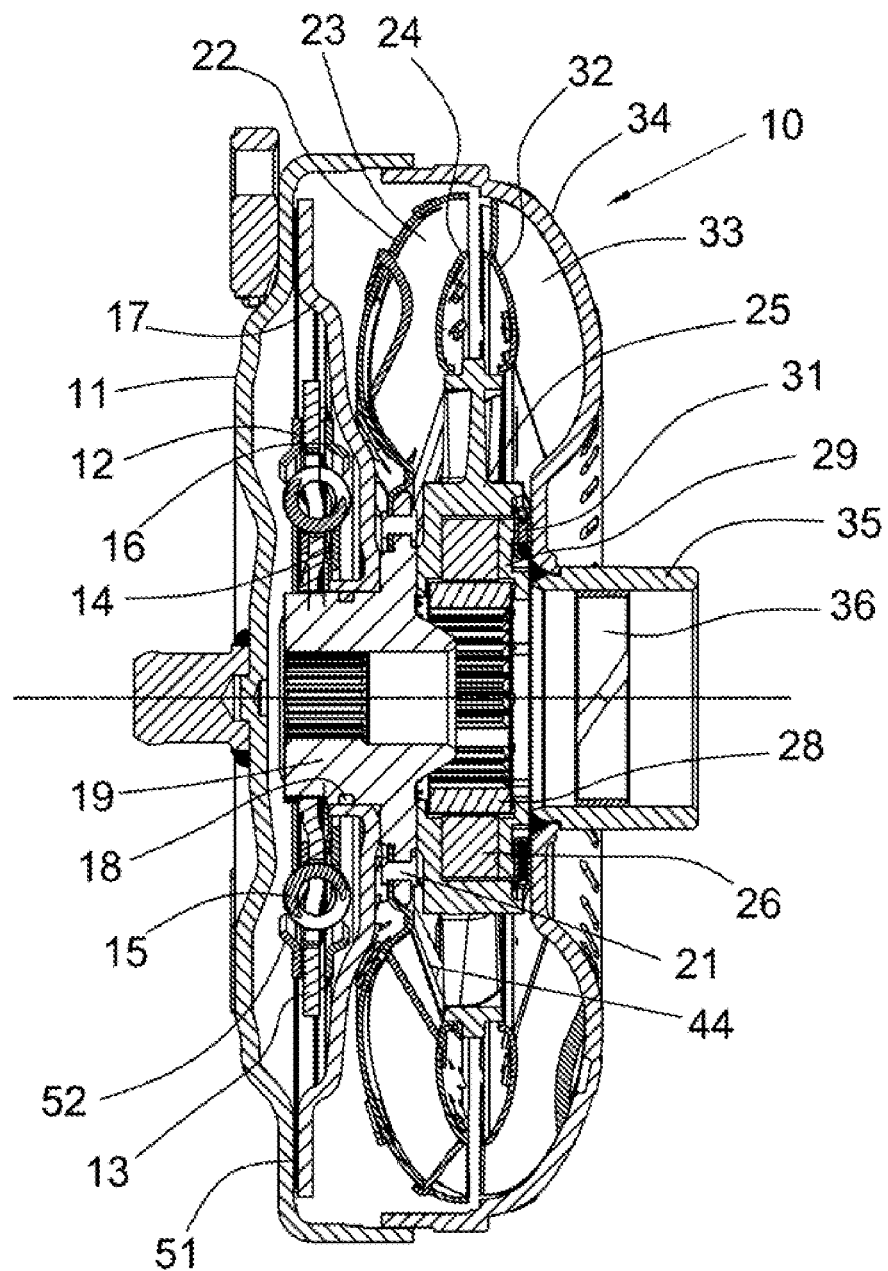
FIG. 4 is a cross-sectional view of the torque converter shown in FIGS. 2 and 3, taken generally along line 4-4 in FIG. 3.
Figure 5:
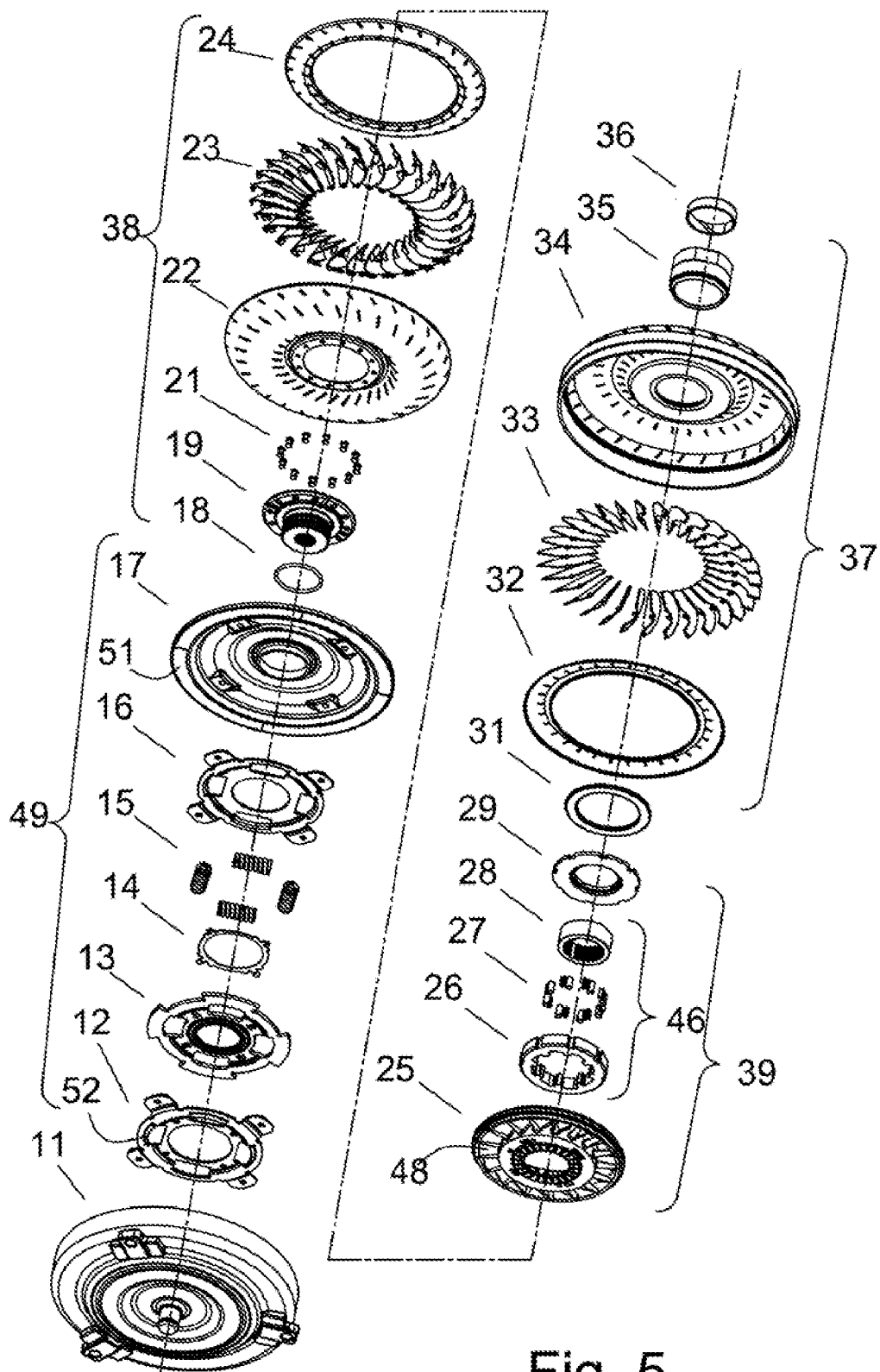
FIG. 5 is a first exploded view of the torque converter shown in FIG. 2, as shown from the perspective of one viewing the exploded torque converter from the left.
Figure 6:
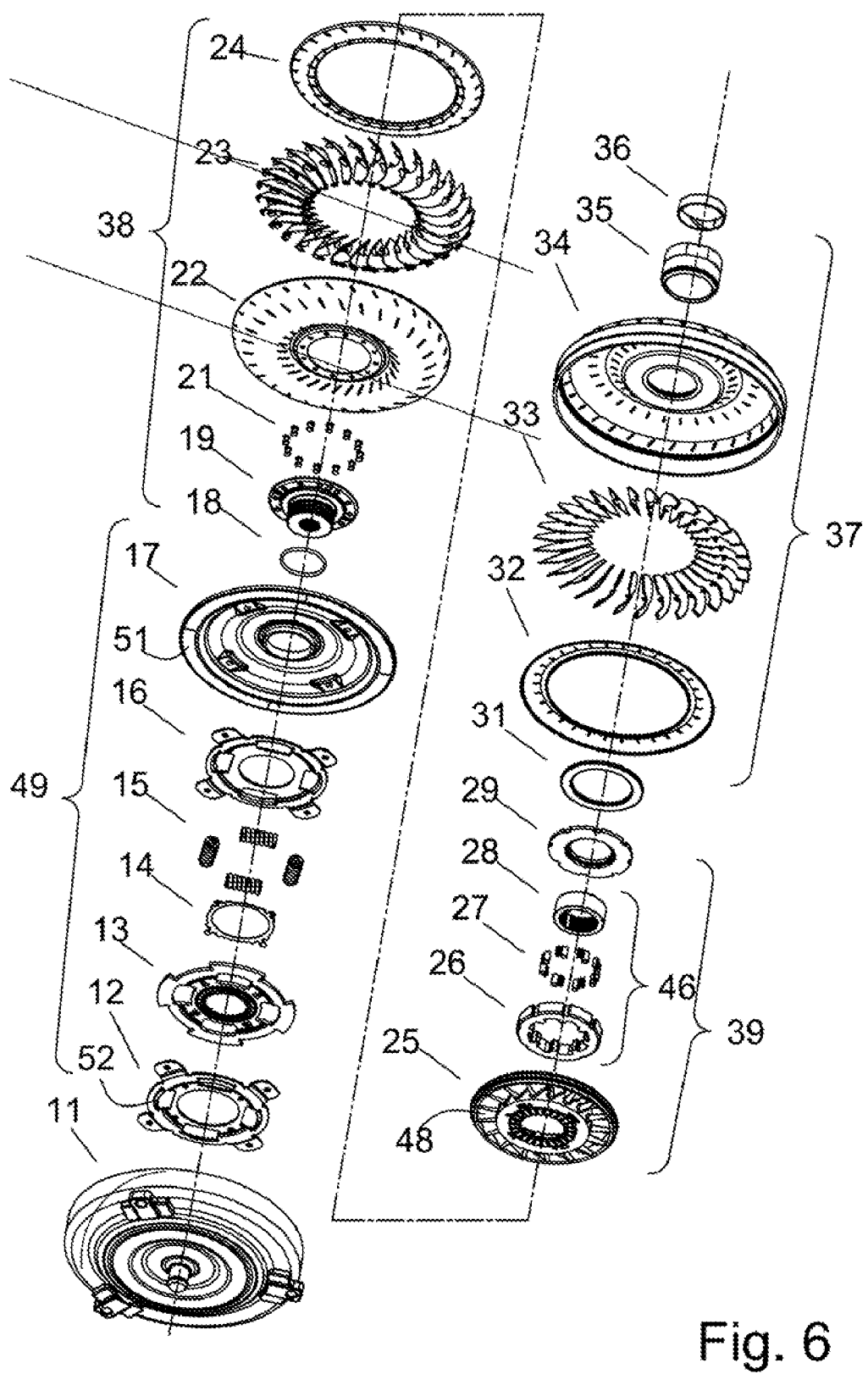
FIG. 6 is a second exploded view of the torque converter shown in FIG. 2, as shown from the perspective of one viewing the exploded torque converter from the right.
Figure 7A:
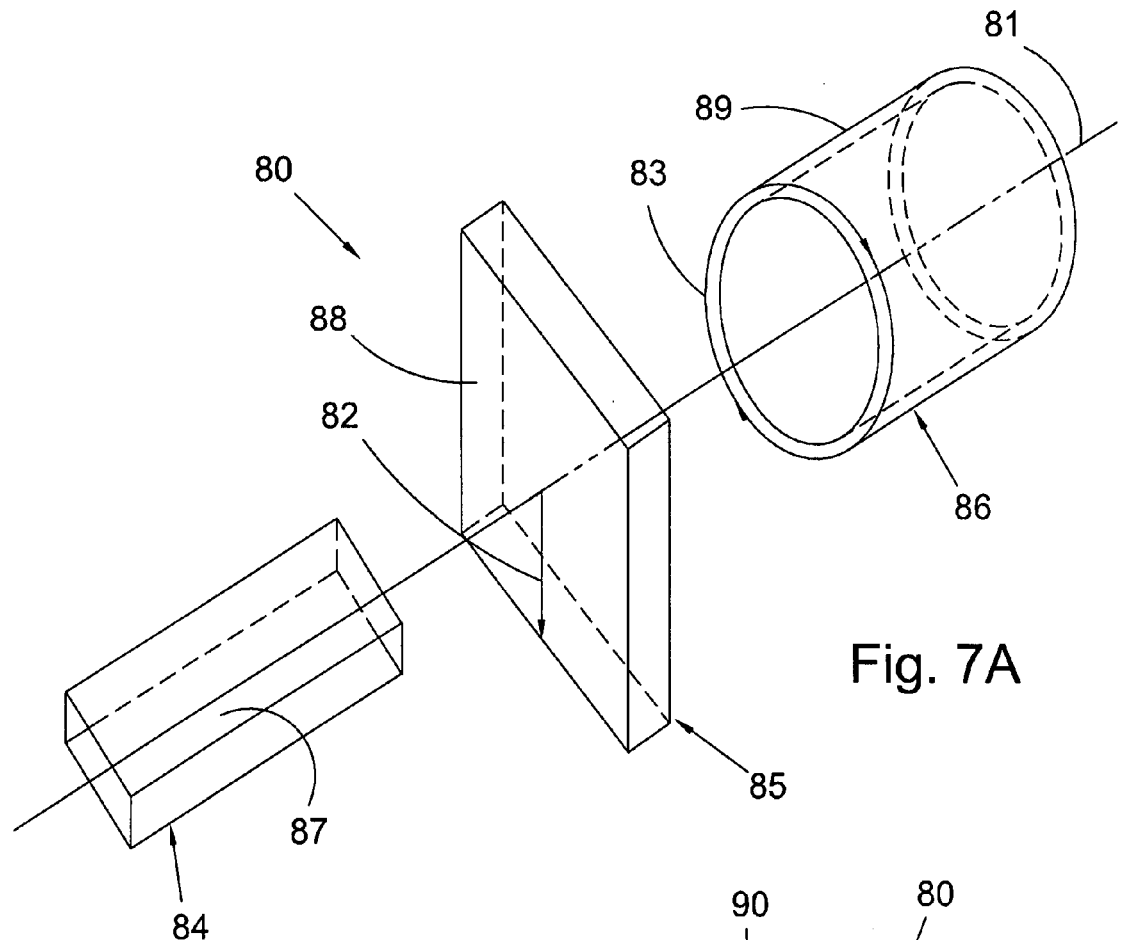
FIG. 7A is a perspective view of a cylindrical coordinate system demonstrating spatial terminology used in the present application.

FIG. 7A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), or circumference 83, respectively. The adjectives "axial," "radial" and "circumferential" refer to orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" refer to an orientation parallel to axis 81, radius 82, or circumference 83, respectively. The adverbs "axially," "radially," and "circumferentially" refer to an orientation parallel to respective planes.

Figure 7B:
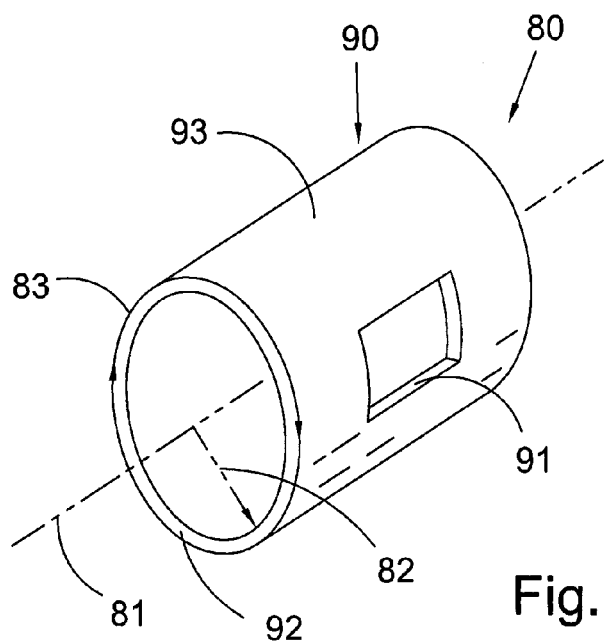
FIG. 7B is a perspective view of an object in the cylindrical coordinate system of FIG. 7A demonstrating spatial terminology used in the present application.

FIG. 7B is a perspective view of object 90 in cylindrical coordinate system 80 of FIG. 7A demonstrating spatial terminology used in the present application. Cylindrical object 90 is representative of a cylindrical object in a cylindrical coordinate system and is not intended to limit the present invention is any manner. Object 90 includes axial surface 91, radial surface 92, and circumferential surface 93. Surface 91 is part of an axial plane, surface 92 is part of a radial plane, and surface 93 is part of a circumferential plane.

Figure 8A:
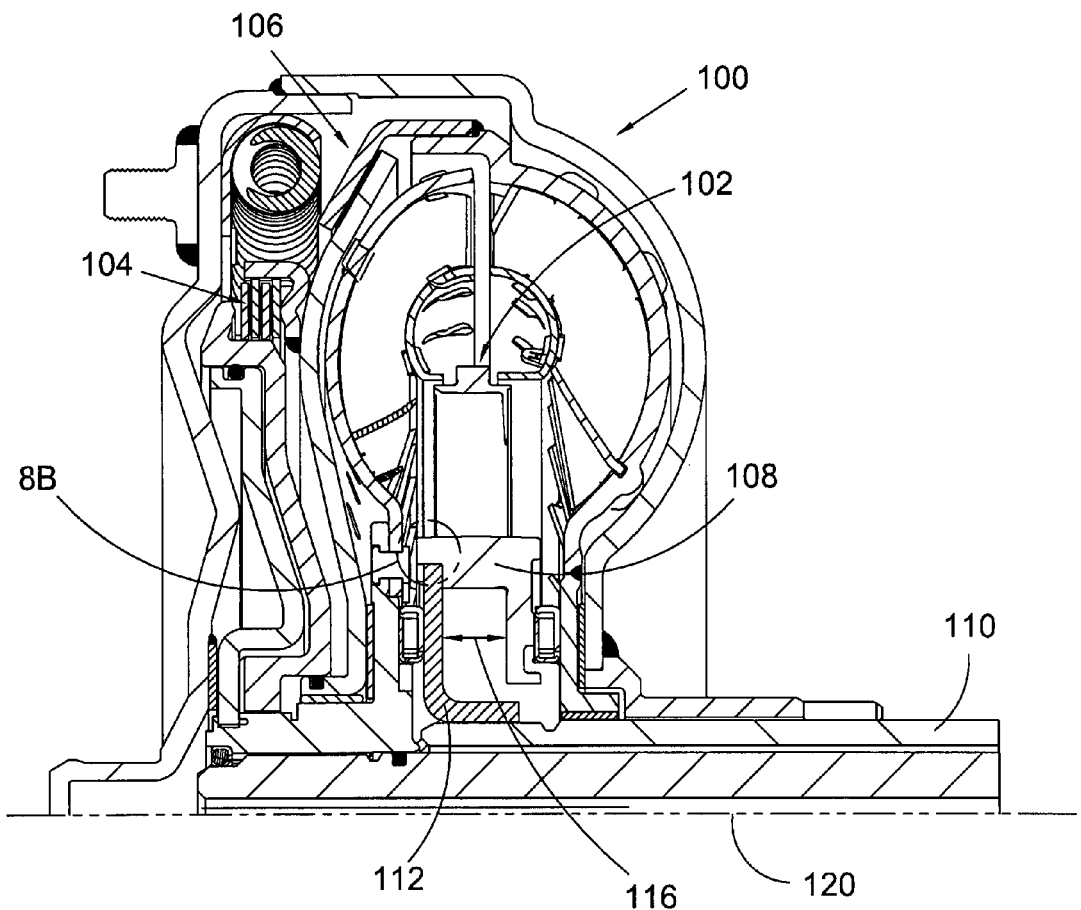
FIG. 8A is a partial cross-sectional view of a present invention torque converter with a fixed stator.

FIG. 8A is a partial cross-sectional view of present invention torque converter 100 with fixed stator 102. Torque converter 100 includes torque converter clutch 104 and pump clutch 106. Converter 100 does not include a stator one-way clutch. Instead, stator inner ring 108 is rotationally fixed with respect to stator shaft 110. In some aspects, ring 108 is rotationally connected to shaft connector element 112, which in turn is rotationally connected to shaft 110. By rotationally fixed, we mean that the ring is connected directly or indirectly to the shaft such that the two components are locked with respect to rotational movement. In this case, the shaft is non-rotatable, therefore, ring 108 also is non-rotatable. Rotationally fixing two components does not necessarily limit relative movement in other directions. For example, it is possible for two components that are rotationally fixed to have axial movement with respect to each other via a spline connection. However, it should be understood that rotational fixing does not imply that movement in other directions is necessarily present. For example, two components that are rotationally fixed can be axially fixed one to the other. The preceding explanation of rotational fixing is applicable to the discussions infra.

Figure 8B:
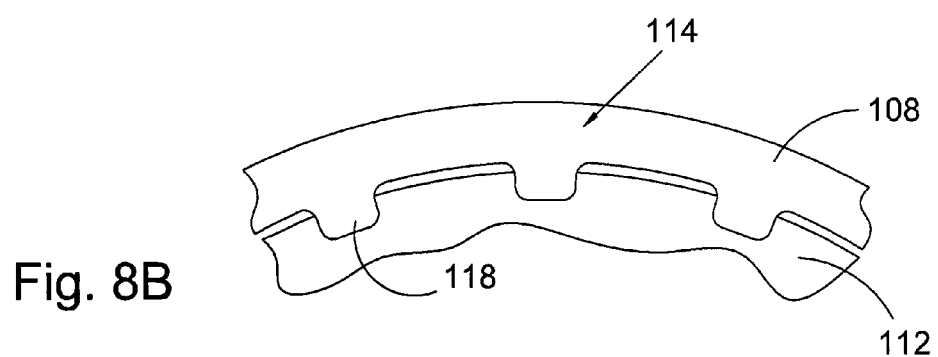
FIG. 8B is a partial front view of Area 8B in FIG. 8A showing a spline connection between the stator and a shaft connector element.

FIG. 8B is a partial front view of Area 8B in FIG. 8A showing spline connection 114 between stator 102, specifically ring 108, and shaft connector element 112. By eliminating a stator one-way clutch, axial space 116 is made available between shaft 110 and ring 108. The use of the axial space is further discussed below. Element 112 can be connected to ring 108 by any means known in the art, for example, welding or press fitting (not shown). In some aspects, spline connection 114 is used. Teeth 118 provide radial centering for stator 102. That is, teeth 118 keep stator 102 at the correct radial distance from axis 120, enabling proper interfacing between the stator and other components in the torque converter. Such proper interfacing at least reduces undesired leakage among components in the torque converter.

In some aspects, element 112 is a stamped flange, which is easily and inexpensively manufactured. Thus, element 112 provides an immediate cost advantage by eliminating a one-way clutch, normally a relatively expensive component in a stator.

Figure 9:
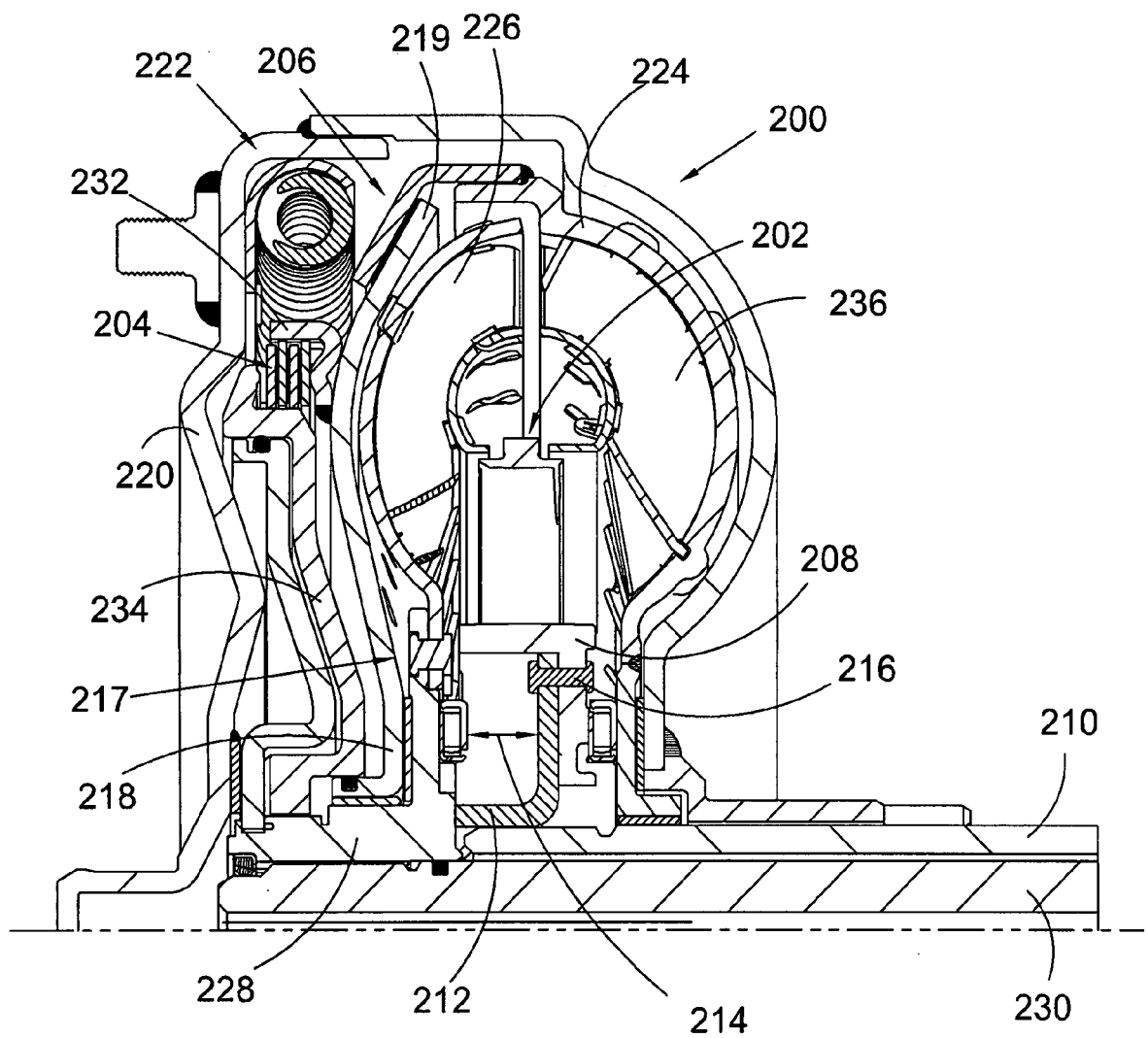
FIG. 9 is a partial cross-sectional view of a present invention torque converter showing axial space opened by removing a stator one-way clutch.

FIG. 9 is a partial cross-sectional view of present invention torque converter 200 showing axial space opened by removing a stator one-way clutch. Torque converter 200 includes torque converter clutch 204 and pump clutch 206. Converter 200 does not include a stator one-way clutch. Instead, stator inner ring 208 is rotationally fixed with respect to stator shaft 210. Ring 208 is rotationally connected to shaft connector element 212, which in turn is rotationally connected to shaft 210. By eliminating a stator one-way clutch, axial space 214 is made available between shaft 210 and ring 208. Element 212 can be connected to ring 208 by any means known in the art. In some aspects, rivets 216 are used. The fixed connection of element 212 and ring 208 via rivets 216 acts to radially center stator 202. In FIG. 9, the axial space between the ring and the shaft faces forward and is accessible to the front of the torque converter.

Figure 10:
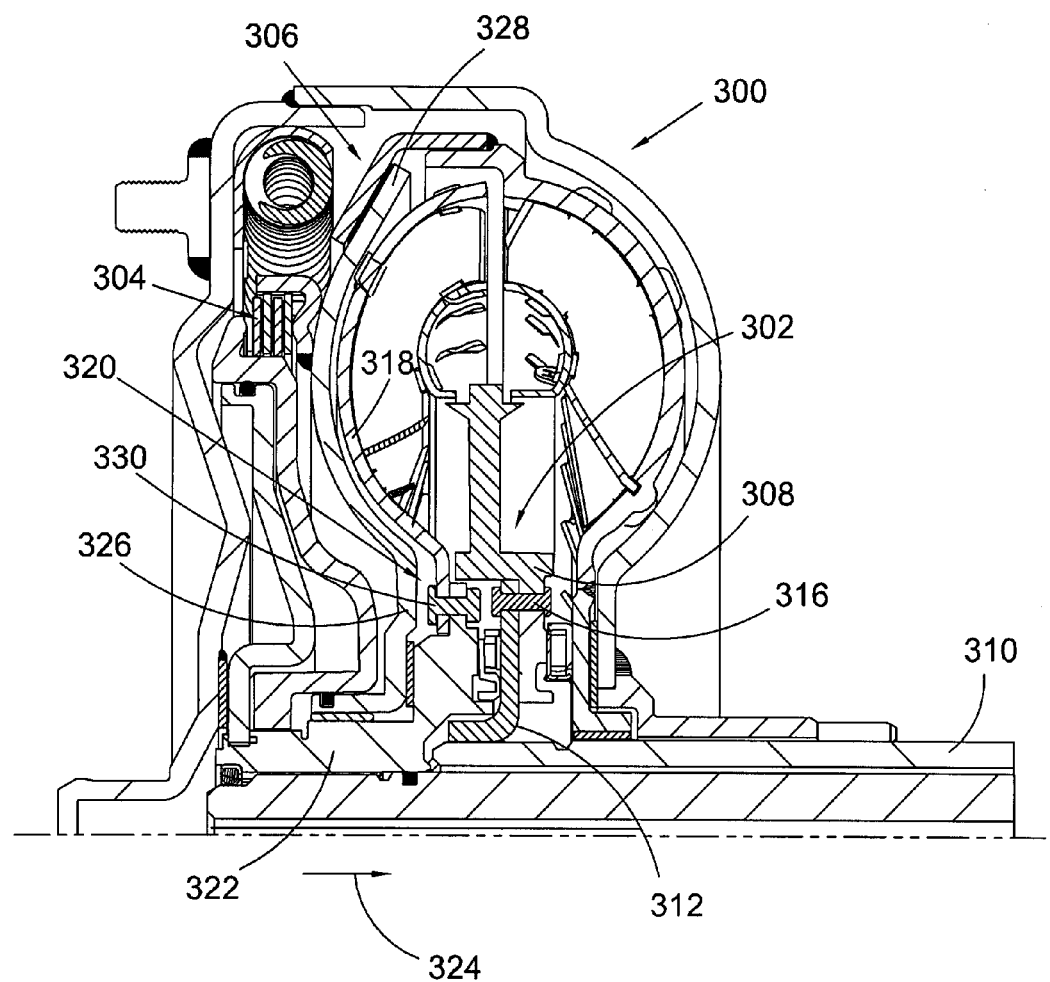
FIG. 10 is a partial cross-sectional view of a present invention torque converter showing a turbine and output hub connection radially aligned with a stator inner ring; and, FIG. 11 is a flow chart illustrating a present invention method of transitioning a torque converter from a torque conversion mode to a lock-up mode.

FIG. 10 is a partial cross-sectional view of present invention torque converter 300 showing a turbine and output hub connection radially aligned with a stator inner ring. Torque converter 300 includes stator 302, torque converter clutch 304, and pump clutch 306. Converter 300 does not include a stator one-way clutch. Instead, stator inner ring 308 is rotationally fixed with respect to stator shaft 310. Ring 308 is rotationally fixed to shaft connector element 312, which in turn is rotationally fixed to shaft 310. Element 312 can be connected to ring 308 by any means known in the art. In some aspects, rivets 316 are used. The fixed connection of element 312 and ring 308 via rivets 316 acts to radially center stator 302.

The following should be viewed in light of FIGS. 9 and 10. FIG. 9 illustrates axial space 214 made available by the removal of a one-way clutch from stator 202. In FIG. 10, ring 308, element 312, and turbine shell 318 have been modified to move connection point 320 between shell 318 and hub 322, further in direction 324 in comparison to connection point 217 in FIG. 9. This modification is enabled by the axial space saved, for example, space 214, by the exclusion of a stator one-way clutch. Thus, connection point 320 is at least partially radially aligned with ring 308. Moving connection point 320 in direction 324 advantageously frees axial space in converter 300 for other uses. For example, portion 326 of plate 328 can be more deeply formed or curved, that is, displaced further in direction 324, than portion 218 of plate 219 in FIG. 9. The additional curvature advantageously increases the stiffness of the plate, optimizing the function of the plate. Shell 318 and hub 322 can be joined by any means known in the art. In some aspects, shell 318 and hub 322 are joined by rivets 330.

Although the discussion that follows is directed to FIG. 9, it should be understood that the discussion is applicable to FIGS. 8A, 8B, and 10 as well. Torque converter clutch 204 and pump clutch 206 are operated to efficiently transition torque converter 200 from a torque conversion mode to a lock-up mode without a one-way clutch in stator 208. In torque conversion mode, clutch 204 is open, clutch 206 is closed and torque is transmitted from housing 220 to damper 222 to plate 219. Plate 219 is part of clutch 206, which transfers the torque to pump shell 224. Pump shell 224 then rotates and imparts torque to turbine 226. Turbine 226 transfers torque to hub 228 and transmission input shaft 230. As the turbine begins to speed up, clutch 204 is engaged. Due to the characteristics of hydraulic circuits, clutch 204 is not immediately clamped, but rather closes more gradually.

As clutch 204 closes, torque is transmitted from the housing to plate 232 and on to plate 234 and hub 228. As the ratio of the rotational speed of turbine 226 with respect to the rotational speed of housing 218 begins to approach the coupling point, clutch 206 is disengaged. The coupling point is the point at which a stator with a one-way clutch would begin to free-wheel. Once clutch 204 is fully engaged, the turbine/housing speed ratio is unity, clutch 206 is disengaged, and torque converter 200 is operating in lock-up mode. In some aspects, pump clutch 206 remains engaged until the turbine/housing speed ratio is unity. In some aspects, clutch 204 engages at a turbine/housing speed ratio of approximately 0.5 or pump clutch 206 disengages at a turbine/housing speed ratio of approximately 0.7. In some aspects, a coupling point is at a turbine/housing speed ratio of approximately 0.8. By disconnecting pump 236, rather than having the pump continue to spin due to the action of a one-way clutch, the inertia of the pump is removed from the system, improving the acceleration characteristics of torque converter 200.

It should be understood that a present invention torque converter is not limited to the sequence of operations or ratios discussed. For example, different values and combinations of the speed ratios noted above are applicable in accordance with the physical and operating characteristics of the torque converter in which the torque converter and pump clutches and fixed stator are disposed.

Returning to FIGS. 8A and 8B, element 112 can replace a thrust washer (not shown), typically made of aluminum or phenolic, associated with a one-way clutch arrangement in a stator. If space 116 is left empty, the weight of stator 108 is advantageously reduced.

Figure 11:
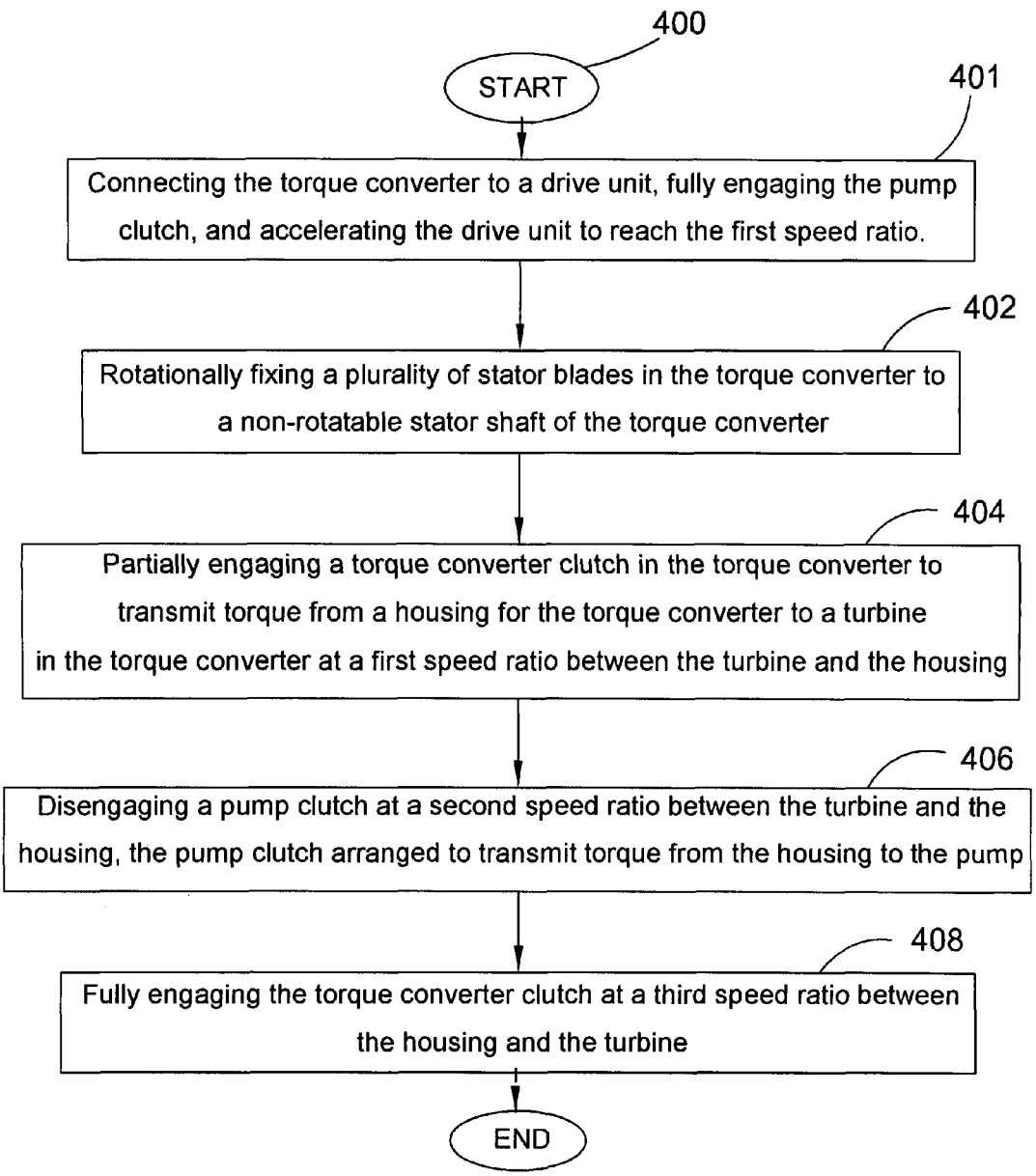

FIG. 11 is a flow chart illustrating a present invention method of transitioning a torque converter from a torque conversion mode to a lock-up mode. Although the method in FIG. 11 is depicted as a sequence of numbered steps for clarity, no order should be inferred from the numbering unless explicitly stated. The method starts at Step 400. Step 402 rotationally fixes a plurality of stator blades in the torque converter to a non-rotatable stator shaft of the torque converter. Step 404 partially engages a torque converter clutch in the torque converter to transmit torque from a housing for the torque converter to a turbine in the torque converter at a first speed ratio between the turbine and the housing. Step 406 disengages a pump clutch at a second speed ratio between the turbine and the housing. The pump clutch is arranged to transmit torque from the housing to the pump. Step 408 fully engages the torque converter clutch at a third speed ratio between the housing and the turbine.

In some aspects, the first speed ratio in Step 404 is less than the second speed ratio. In some aspects, the second speed ratio in Step 406 is less than a fourth speed ratio between the housing and the turbine. The fourth speed ratio is associated with a first coupling point between the turbine and the pump. In some aspects, the fourth speed ratio is approximately 0.8. In some aspects, the third speed ratio in Step 408 is greater than a fifth speed ratio between the housing and the turbine. The fifth speed ratio is associated with a second coupling point between the turbine and the pump. In some aspects, the fifth speed ratio is approximately 0.8.

In some aspects, the first speed ratio in Step 404 is approximately 0.5. In some aspects, the second speed ratio in Step 406 is approximately 0.7 or one. In some aspects, the third speed ratio in Step 408 is approximately one. In some aspects, the present invention method includes Step 401 in which the torque converter is connected to a drive unit. Step 401 fully engages the pump clutch and accelerates the drive unit to reach the first speed ratio.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A method of transitioning a torque converter from a torque conversion mode to a lock-up mode, comprising:
   rotationally fixing a plurality of stator blades in the torque converter to a non-rotatable stator shaft of the torque converter;
   partially engaging a torque converter clutch in the torque converter to transmit torque from a housing for the torque converter to a turbine in the torque converter at a first speed ratio between the turbine and the housing;
   disengaging a pump clutch at a second speed ratio between the turbine and the housing, the pump clutch arranged to transmit torque from the housing to the pump; and,
   fully engaging the torque converter clutch at a third speed ratio between the housing and the turbine.

2. The method recited in claim 1 wherein the first speed ratio is less than the second speed ratio.

3. The method recited in claim 1 wherein the second speed ratio is less than a fourth speed ratio between the housing and the turbine, the fourth speed ratio associated with a first coupling point between the turbine and the pump.

4. The method recited in claim 3 wherein the fourth speed ratio is approximately 0.8.

5. The method recited in claim 1 wherein the third speed ratio is greater than a fifth speed ratio between the housing and the turbine, the fifth speed ratio associated with a second coupling point between the turbine and the pump.

6. The method recited in claim 5 wherein the fifth speed ratio is approximately 0.8.

7. The method recited in claim 1 wherein the first speed ratio is approximately 0.5.

8. The method recited in claim 1 wherein the second speed ratio is approximately 0.7.

9. The method recited in claim 1 wherein the second speed ratio is approximately one.

10. The method recited in claim 1 wherein the third speed ratio is approximately one.

11. The method recited in claim 1 wherein the torque converter is connected to a drive unit; and, the method further comprising:

fully engaging the pump clutch; and, accelerating the drive unit to reach the first speed ratio.

\* \* \* \* \*